United States Patent [19]

Schussler et al.

[11] 4,150,254
[45] Apr. 17, 1979

[54] TELEPHONE SYSTEM FOR SELECTING AND REPRODUCING TEXT ON A SCREEN

[75] Inventors: Hans Schüssler, Backnang; Bernhard Wiest, Grossaspach, both of Fed. Rep. of Germany

[73] Assignee: Licentia Patent-Verwaltungs-G.m.b.H., Frankfurt, Fed. Rep. of Germany

[21] Appl. No.: 902,749

[22] Filed: May 3, 1978

[30] Foreign Application Priority Data

May 4, 1977 [DE] Fed. Rep. of Germany ....... 2719827

[51] Int. Cl.² ........................................... H04M 11/08
[52] U.S. Cl. ................................ 179/2 TV; 179/2 DP
[58] Field of Search .......................... 179/2 DP, 2 TV

[56] References Cited

U.S. PATENT DOCUMENTS 3,301,957   1/1967   Germond et al. ................ 179/2 DP

*Primary Examiner*—George G. Stellar

*Attorney, Agent, or Firm*—Spencer & Kaye

[57] ABSTRACT

In a system for displaying text information obtained from a remote text data bank, which system includes a television receiver equipped for receiving and storing the text information and displaying the information on its screen, an operating device operatively associated with the receiver for effecting program selection and control of the television receiver functions, an accessory device which is connected with the television receiver by means of a line, which accessory device includes a modulator, a demodulator, a dialing device, a conventional telephone interface for connection to a telephone and an interface for connecting the accessory device to an outside telephone line, operating device is arranged to establish a connection with the remote text data bank via the line, the accessory device and the outside telephone line for permitting selected texts to be called up for display on the screen of the television receiver.

23 Claims, 2 Drawing Figures

TELEPHONE SYSTEM FOR SELECTING AND REPRODUCING TEXT ON A SCREEN

BACKGROUND OF THE INVENTION

The present invention relates to a system for selecting and reproducing text on a screen of a television receiver which is equipped to record, store and reproduce text infomation and is provided with an operating deivce for program selection and control of the television receiver functions.

This system includes an accessory device which is connected with the television receiver by means of a line and includes a modulator and a demodulator and is provided with an interferace for a telephone and an interface for connecting it to outside the telephone line.

Two such systems have been proposed thus far. They are the Viewdata system originating in Great Britain, from the British Post Office, and the TV-Phone originating in the U.S.A. from Phonics Corporation.

Viewdata is a telecommunication system design in the developmental stage which is intended to enable the user to obtain information from a text data bank. To do this, he establishes a connection with the text data bank. Upon call-up, the text data bank transmits the requested data at a bit rate of 1200 or 2400 bits per second, as is customary in a dial telephone system. After having dialed the address of the specific desired data, there is a certain access time delay before the data appear on the screen. In dialog communications, the desired data is identified, after the dial connection has been established, in a dialog between user and text data bank and is then transmitted to the user.

In the Viewdata system it is proposed to provide for the dialog: firstly, a simple yes/no signaling device; secondly, a simple keyboard, for example, like that of telephones equipped for push-button dialing; and thirdly, a complete alphanumeric keyboard. In the call-up mode as well as in the dialog mode, a connection is established either with an available telephone receiver or with a separate dialing device. It has also been proposed to combine all possible modes of communication into a complex instrument designated the viewdataphone.

The second prior art video data system, the TV-Phone, has been designed especially for communication between the deaf. The users are able to write in, via a complete type-writer keyboard, a text which then appears on their own screen and on the screen of the receiving user, the text being recorded continuously.

The above-mentioned video data systems require more or less expensive additional keyboard devices which must be connected to an accessory device, the adapter.

SUMMARY OF THE INVENTION

It is an object of the present invention to enable a system having such capability to be constructed without the need for development, fabrication and use of any accessory keyboards or new complex devices, but instead by using available instruments which have been suitably modified.

A further object of the invention is to enable connection with a remote text data bank to be established not only at the available telephone set, which sometimes is installed inconveniently far away from the television receiver and thus would make operation complicated, but also at the location where the text is to be displayed, or better yet where the text is being viewed.

These and other objects are achieved in a system for displaying text information obtained from a remote text data bank, which system includes a television receiver equipped for receiving and storing the test information and displaying the information on its screen, an operating device operatively associated with the receiver for effecting program selection and control of the television receiver functions, an accessory device which is connected with the television receiver by means of a line, which accessory device includes a modulator, a demodulator, a dialing device, a conventional telephone interface for connection to a telephone and an interface for connecting the accessory device to an outside telephone line, by arranging the operating device to establish a connection with the remote text data bank via the line, the accessory device and the outside telephone line for permitting selected texts to be called up for display on the screen of the television receiver.

The elimination, through use of the present invention, of new expensive accessory keyboards constitutes a considerable savings so that the incentive for acquiring this new mode of telecommunications in the form of a video text system is enhanced. The advantage of increased ease of operation resulting from the possibility of operating the system at the receiving location or at the viewing location, respectively, compared to operation only at the remote telephone receiver is obvious.

Modifications of universally available remote control devices for the operation of television receivers for use with such video data display systems can be kept to an inexpensive level.

DESCRIPTION OF THE PREFERRED EMBODIMENTS

Figure 1:
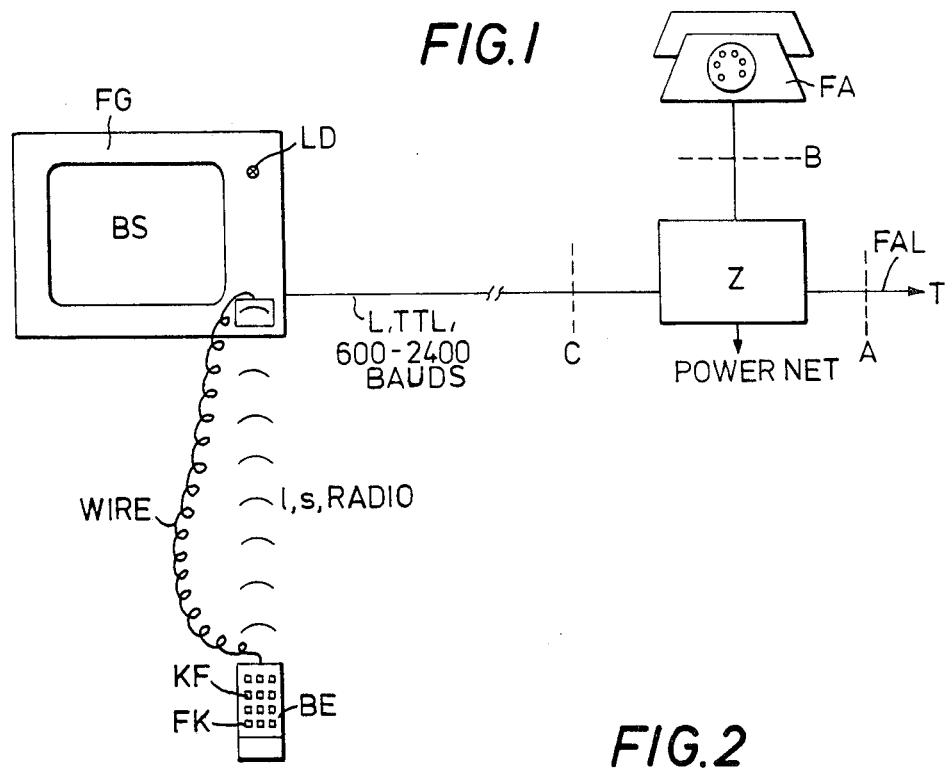
FIG. 1 is a schematic diagram of a system according to the present invention.

FIG. 1 shows, at a user's end, a system according to the invention which includes a television receiver FG equipped to receive, store and display text informations, e.g., for the display of a videotext and provided with an operating device BE for program selection as well as for controlling the functions of the television receiver, an accessory device Z which is connected with the television receiver through a line L having an interface C and which includes a modulator, a demodulator and a dialing device, an interface B for connection to the telephone FA, and an interface A for connection to an outside telephone line FAL where the interface A and B may be the same.

With the aid of device BE a connection is established, according to the conventional pulse dialing process or the more modern tone dialing process, via line L, accessory device Z and the telephone line FAL to a remote text data bank T from where certain texts are called up for display on the television screen BS. Transmission of the text information through the telephone connection line takes place at bit rates of 600 to 2400 bauds according to one of the conventional modulation methods.

The demodulator in the accessory device Z demodulates the information and transmits it in digital form through line L to the television receiver. There the test is stored, is brought into video display form with the aid of character generators, and is then displayed.

In the so-called dialog mode, an interactive dialog between the user and the text data bank informs the latter which specific information is to be transmitted. The dialog signals from the user are here generated by keyboard functions KF, feeding a brevity code for example, of the operating device BE, are transmitted to the accessory device Z via line L where they are modulated in a modulator and transmitted in this modulated form over the telephone branch line FAL. The transmission procedure is one of the conventional ones, for example HDLC, SDLC or others, and the code is, for example, the ASCII code or a similar code.

In one embodiment of the invention, the occupied, or busy, state of the telephone branch line is indicated in the television receiver. This may be effected with a unique-colour display e.g. a lamp or a luminescent diode LD, or alternatively it may be displayed on the screen. From this indication the video data user can recognize, for example, whether the telephone branch line is available, so that he can attempt to establish connection with the remote text data bank, or whether the telephone branch line is occupied by users in conversation via the telephone instrument FA connected to his system by means of connector B of the accessory device Z. Of course, the occupied state can be indicated by a busy signal in the television receiver or in the operating device that briefly appears upon the attempt to dial a number.

In a further embodiment of the invention, the operating device BE or the accessory device Z are equipped with a dial memory which, provided with the stored number of the nearest text data bank, automatically establishes the connection when an appropriate function key FK is depressed.

The illustrated embodiment of the invention includes an operating device BE which is remote from the television receiver and is in communication with the television receiver via infrared light 1, ultrasounds or other means (radio, wire for example) and makes it possible to operate the video text system from a viewing distance.

Figure 2:
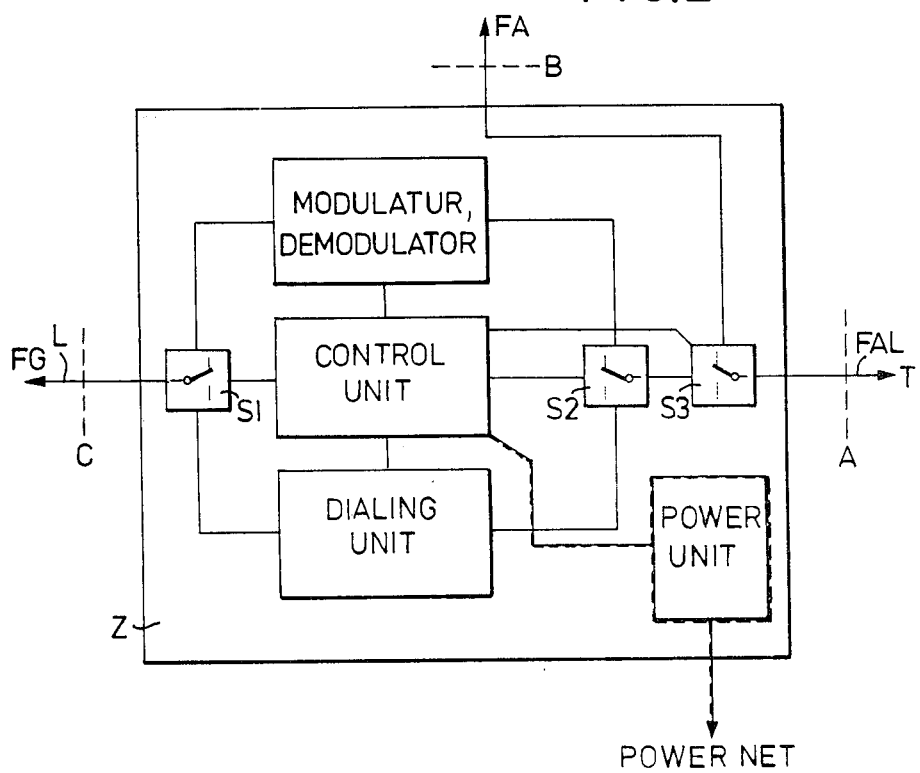
FIG. 2 is a schematic diagram of the accessory device Z.

FIG. 2 shows the embodimental block diagram of the accessory device Z comprehending modulator, demodulator, dialing unit, perhaps a power unit, control unit and some switching units S. The last one S3 connect the telephone line FAL either the telephone set FA or via the link L the television receiver FG. In dialing mode the dialing unit is triggered by the operating device and sends its signals through the path switching units S2, S3, telephone line FAL to exchange. If the connection to the distant text data bank is established, the dialog between user and said bank is effected on the way link L, switching unit S1, modulator, demodulator respectively, switching units S2, S3, telephone line FAL etc. A further inventional embodiment looks for an own voltage maintenance having a power unit connected to the power net.

It will be understood that the above description of the present invention is susceptible to various modifications, changes and adaptations, and the same are intended to be comprehended within the meaning and range of equivalents of the appended claims.

What is claimed is:

1. In a system for displaying text information obtained from a remote text data bank, which system includes a television receiver equipped for receiving and storing the text information and displaying the information on its screen, an operating device operatively associated with the receiver for effecting program selection and control of the television receiver functions, an accessory device which is connected with the television receiver by means of a line, which accessory device includes a modulator, a demodulator, a dialing device, a conventional telephone inferface for connection to a telephone, and an interface for connecting the accessory device to an outside telephone line, the improvement wherein said operating device is operative to establish a connection with the remote text data bank via said line, said accessory device and said outside telephone line for permitting selected texts to be called up for display on the screen of said television receiver.

2. System as defined in claim 1 wherein said operating device is arranged to establish the connection by the conventional pulse method.

3. System as defined in claim 1 wherein said operating device is arranged to establish the connection by a tone dialing process.

4. System as defined in claim 1 wherein said text information is transmitted to said receiver at a bit rate of 600 to 2400 bauds.

5. System as defined in claim 4 further comprising an interface having TTL levels and connecting said accessory device to said receiver via said line.

6. System as defined in claim 4 wherein the occurrence of an occupied state of said outside telephone line is indicated at said television receiver.

7. System as defined in claim 6 which such indication is effected by establishment of an unique-color display.

8. System as defined in claim 1 wherein said accessory device is provided with its own mains voltage connection.

9. System as defined in claim 1 wherein said accessory device is arranged to permit line checking according to testing criteria applicable to a telephone receiver.

10. System as defined in claim 1 wherein said accessory device is arranged to connect a telephone to the outside telephone line so that normal telephonic conversation can take place.

11. System as defined in claim 10 wherein said accessory device is arranged to interrupt its connection to said television receiver when a telephonic conversation connection has been or is being established via the telephone.

12. System as defined in claim 1 wherein said operating device is arranged to effect dialing to an automatic text data bank.

13. System as defined in claim 12 wherein said operating device is arranged to select and call up texts through an interactive dialog.

14. System as defined in claim 13 wherein the text selection is effected by means of feeding a brevity code into said operating device.

15. System as defined in claim 1 wherein said operating device is arranged to be removed from said television receiver.

16. System as defined in claim 15 wherein said operating device communicates with said television receiver by means of an infrared light link.

17. System as defined in claim 15 wherein said operating device communicates with said receiver by means of an ultrasonic link.

18. System as defined in claim 15 wherein said operating device communicates with said receiver by means of a radio emission link.

19. System as defined in claim 15 wherein said operating device communicates with said receiver via a wire connection.

20. System as defined in claim 1 wherein said operating device is arranged to permit a one-time actuation thereof to automatically establish the connection with a text data bank.

21. System as defined in claim 20 wherein said operating device is provided with a function key to which such one-time actuation is to be applied.

22. System as defined in claim 1 arranged to display the text on the screen in synchronism with its reception.

23. System as defined in claim 1 arranged to effect text selection via a telephone in a telephone dialog.

* * * * *